A. Nash,
Circular Sawing Machine,

N° 1,857.   Patented Nov. 13, 1840.

UNITED STATES PATENT OFFICE.

AMAZIAH NASH, OF CALAIS, MAINE.

MACHINE FOR SAWING PAVING-BLOCKS OF WOOD.

Specification of Letters Patent No. 1,857, dated November 13, 1840.

*To all whom it may concern:*

Be it known that I, AMAZIAH NASH, of Calais, in the county of Washington and State of Maine, have invented a new and useful Machine for Sawing Blocks of Wood for Paving Streets, which is described as follows, reference being had to the annexed drawings of the same, making part of this specification.

Figure 2:
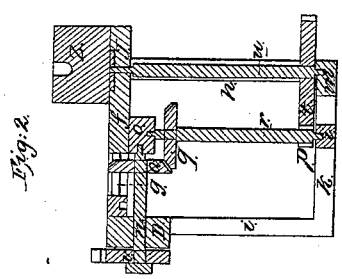
Figure 3:
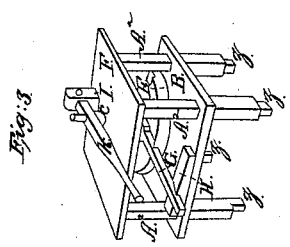
Figure 4:
Figure 1:
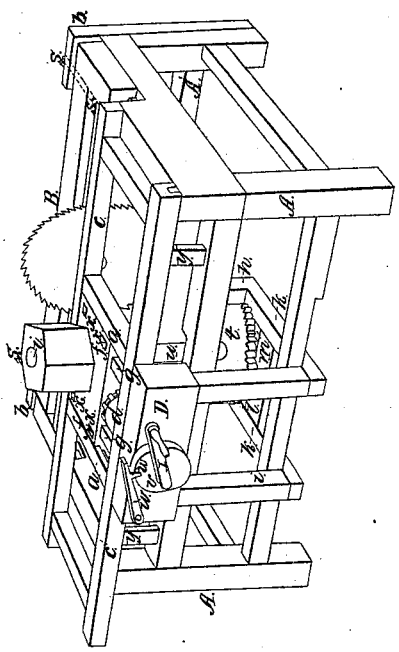

Figure 1 is a perspective view of the machine. Fig. 2 is a section of part of the gearing for adjusting the block. Fig. 3 is a perspective view of an apparatus which may be substituted for a part of the machine represented in Fig. 1 for holding and gaging the block. Fig. 4 is the plate fixed to the block with a square aperture in the center to receive the head of the shaft $u$.

This machine consists of a rectangular frame A of suitable size and strength to contain and support the parts hereafter described. On this frame there is placed a rectangular sliding saw frame B, made as long as the main frame A and nearly half its width, composed of two parallel longitudinal timbers united together by two parallel cross timbers mortised and tenoned together;—which saw frame B, rests upon the top of the main frame and is held firmly by two parallel horizontal screws $s\ s$ which pass through two perpendicular boards $b\ b$ secured to the side of the main frame, and into the side of said saw frame B by which said frame is moved toward the block to be sawed, or drawn back from it whenever it is desired to advance, or recede, the circular saw carried by said frame. This circular saw is fixed on a horizontal axle lying across the two parallel longitudinal timbers of the said adjustable saw frame B, near the middle thereof; which axle turns in boxes in said frame. The saw is turned by a band passed around a pulley fixed on said axle and leading from thence to the driving power.

When a large block of wood is required to be sawed and the center pin on which it is fixed remains unchanged in position the saw must be receded from the block which is effected by turning the screws to the left, which draws back the carriage. When a small block is to be sawed the saw must be advanced toward it which is accomplished by turning the screws to the right.

On the opposite side of the main frame from that on which the above described saw frame B is placed, is arranged a carriage $c$ for carrying the block to be sawed; it is composed of two parallel longitudinal timbers, one of which is grooved on the under side— the other is plain and both are connected together by four cross timbers mortised and tenoned into the same; which carriage moves longitudinally backward and forward on top of the main frame, being guided and kept in place by two permanent guides $y\ y$ projecting from the top of one of the side pieces of the frame A and fitting in the groove in the under side of the outside piece of said carriage. This carriage moves lengthwise of the frame and is for the purpose of bringing the block of wood to be sawed to the saw in cutting it.

In order to adjust the block to the saw crosswise, there is arranged in the carriage a slide $f$ with a hanging frame carrying certain gearing, hereafter described, which slide is made to move transversely in said carriage; it is two thirds its width and has tongues cut on its ends which move in grooves made on the inner sides of the middle parallel cross pieces $a\ a$ of the carriage. From the rear edge of said slide project two parallel slats $g\ g$ graduated in inches and decimals of inches and numbered in order to determine the size of the block and the length of the cut to be made; which slats pass through rectangular openings in the grooved side piece of the carriage;—and having secured to their outer extremities a block of wood D, into which they are mortised and from which block D there projects downward two vertical hanging posts $i\ i$ having their lower ends mortised and tenoned into two horizontal parallel suspended timbers $k\ k$ extending under the sides of the main frame toward the saw into which are mortised and tenoned two vertical posts $h\ h$ which are mortised and tenoned into the under side of the slide $f$ in a hanging position. Into the two horizontal parallel pieces $k\ k$ of said hanging frame are mortised and tenoned two horizontal transverse parallel timbers $l\ m$ in which turn the gudgeons of two vertical shafts $r$ and $u$; the gudgeons of the upper end of one of which $u$, to which the block to be sawed is made fast, passes through the slide $f$ and the gudgeon in the upper end of the other shaft $r$ turns in a block $o$ fastened to the under side of the slide $f$. On the lower end of the shaft $u$ is a cog wheel $t$ which works into a pinion $p$ on the shaft $r$. On the upper end of said shaft $r$ is a horizontal bevel wheel $q$ meshing into a vertical bevel wheel $d$ fixed on a horizontal shaft $n$ whose gudgeon turns in the block as just mentioned, secured to the under side of the slide $f$ and which said shaft turns in the block D through which it passes and on the part projecting beyond said block is fixed a wheel $v$ with a notch in its periphery into which falls a dog or catch $w$ on the under side of an arm $w'$ fastened to said block for holding the before described gearing and also the vertical shaft $u$ on which the block $z$ is placed from turning while the circular saw is cutting off the sides of said block. The horizontal shaft $u$ is turned by a crank I on the end thereof. The before described gearing is for the purpose of turning the block for the operations of the saw. The block is secured to the upper end of the vertical shaft $w$ passing through the slide $f$ by means of a plate J Fig. 4, with a square aperture in it, said plate being fastened to the under side of the block $z$; the square aperture receives the square end of the vertical shaft $w$. The aforesaid notched wheel $v$ is for regulating the length of the side to be cut on the block. And the scales on the parallel slats indicate the size of the block and regulate the length of cut.

The block of wood being secured on the upper end of the shaft $u$ and held from turning horizontally by the notched wheel $v$ and dog $w$ and the saw being in motion the carriage is shoved forward by hand carrying the block up to the saw which takes off a side;—the carriage is then run back—the dog raised—the crank turned, which turns the gearing and moves the block around. The dog $w$ is then dropped into the notch, which holds the gearing from turning and retains the block in a permanent position, the carriage is then shoved forward as before. When it is required to make a lesser cut with a smaller sized block and the saw remains in its former position the slide $f$ must be advanced toward the saw. And in order to change the cut of the sides of the blocks, whether squares or polygons, the diameter of the notched wheel must be changed. All the dimensions and proportions of the machine may be varied to suit circumstances.

The block may be held, shifted, and moved by means of a frame and fixtures let into the top of the slide $f$, the tenons $z$, Fig. 3, fitting the mortises $x$ in Fig. 1 in which case the frame and fixtures described as appended to the lower side of said slide $f$ must be removed, as in this case they will not be needed. In said frame $A^2$ Fig. 3 there is placed an index wheel E divided around its circumference into six parts (when hexagons are to be sawed) for the purpose of canting or turning the block around so as to present it in a proper position to the saw. $A^2$ $A^2$ $A^2$ $A^2$ represent the four posts of said frame which are to support the gearing, &c., for holding and turning the block. B is a piece of board let down over said posts A A A A resting on shoulders on the posts and which receives the lower end of a shaft or spindle C attached to said wheel E. Instead of a board a horizontal frame may be substituted.

F is a piece of board let on the top of the posts A and supports the upper end of the shaft or spindle C. A light frame may also be substituted for this board. G is a latch let over the shaft or spindle $c$ loosely for the purpose of turning and securing the index wheel E in its proper place to which index wheel E the block to be sawed is made fast by means of the center vertical shaft passing down through the index wheel into the block to be sawed.

H is a piece of thick plank fastened to the board B in which is cut a notch into which the latch G drops which also falls into a notch of the index wheel for holding the block in the required position to be sawed and when raised from the notch in the plank H is used for turning the index wheel.

I is a post secured in the top board F by mortise and tenon to receive the end of a lever K.

K is a lever to receive the upper end of the shaft or spindle $c$ secured by a pin or otherwise for the purpose of raising the shaft or spindle $c$ and with it the index wheel E and drawing the shaft from the block and thus disengaging the same therefrom so that the block can be removed and another put in its place— said lever being also used for holding down the block firmly while being sawed.

The invention claimed and desired to be secured by Letters Patent consists in—

The combination and arrangement of the longitudinally moving carriage,—transversely moving slide,—(with its hanging frame and gearing for holding the block of wood to be sawed, and advancing or receding the same to or from the saw and turning it horizontally in order to saw it into a polygon or other figure) and the notched wheel and dog with the sliding frame and saw as described:—also in combination the sliding frame and saw; the frame, shaft, notched wheel, latch, and lever, represented in Fig. 2 for adjusting and holding the block to be sawed, used instead of the hanging frame and gearing before described.

AMAZIAH NASH.

Witnesses:
 WM. P. ELLIOT,
 EDMUND MAHER,